(12) United States Patent
Makino

(10) Patent No.: US 6,320,647 B1
(45) Date of Patent: Nov. 20, 2001

(54) MULTI-BEAM LIGHT SOURCE UNIT, MULTI-BEAM SCANNER AND IMAGE FORMING APPARATUS

(75) Inventor: Hideyo Makino, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/361,993

(22) Filed: Jul. 28, 1999

(30) Foreign Application Priority Data

Jul. 29, 1998 (JP) ................................. 10-229409
Dec. 11, 1998 (JP) ................................. 10-375098

(51) Int. Cl.[7] ............................ G03B 27/54; G02B 26/08
(52) U.S. Cl. .......................... 355/67; 359/204; 359/210
(58) Field of Search ..................... 355/67, 70; 399/220; 359/204, 216, 210, 205, 203, 209, 196

(56) References Cited

U.S. PATENT DOCUMENTS

| | | | |
|---|---|---|---|
| 4,393,387 | 7/1983 | Kitamura | 327/113 |
| 5,753,907 | * 5/1998 | Nakajima et al. | 250/234 |
| 5,774,248 | * 6/1998 | Komatsu | 359/204 |
| 5,808,774 | * 9/1998 | Kawabata | 359/210 |
| 5,864,739 | * 1/1999 | Kaneko et al. | 399/220 |
| 5,999,345 | * 12/1999 | Nakajima et al. | 359/821 |
| 6,049,408 | * 4/2000 | Tada | 359/204 |
| 6,081,364 | * 6/2000 | Kimura | 359/204 |

FOREIGN PATENT DOCUMENTS

| | | |
|---|---|---|
| 56-42248 | 4/1981 | (JP) . |
| 8-136841 | 5/1996 | (JP) . |
| 9-26550 | 1/1997 | (JP) . |
| 9-33834 | 2/1997 | (JP) . |
| 9-251137 | 9/1997 | (JP) . |
| 10-10447 | 1/1998 | (JP) . |
| 10-10448 | 1/1998 | (JP) . |
| 10-319338 | 12/1998 | (JP) . |
| 11-58829 | 3/1999 | (JP) . |
| 11-72729 | 3/1999 | (JP) . |

* cited by examiner

Primary Examiner—Russell Adams
Assistant Examiner—Rodney Fuller
(74) Attorney, Agent, or Firm—Oblon, Spivak, McClelland, Maier & Neustadt, P.C.

(57) ABSTRACT

A multi-beam light source unit is provided with a light source emitting a plurality of light beams from corresponding light emitting points arranged in an array at equal intervals, a collimator lens forming the plurality of light beams into parallel bundle of rays, and an adjusting mechanism adjusting relative positions of the light source and the collimator lens so that a central part between the light emitting points at both ends of the light source matches an optical axis of the collimator lens. The collimator lens is rotatable about the optical axis of the collimator lens.

11 Claims, 6 Drawing Sheets

MULTI-BEAM LIGHT SOURCE UNIT, MULTI-BEAM SCANNER AND IMAGE FORMING APPARATUS

BACKGROUND OF THE INVENTION

1. Field of the Invention

The present invention generally relates to multi-beam light source units, multi-beam scanners and image forming apparatuses, and more particularly to a multi-beam light source unit which generates a plurality of beams in one optical scan, a multi-beam scanner which uses such a multi-beam light source unit to make the optical scan, and an image forming apparatus such as a laser printer, a digital copying machine and a facsimile machine which forms an image by use of such a multi-beam scanner.

2. Description of the Related Art

Recently, in image forming apparatuses such as laser printers and digital copying machines, a multi-beam scanner is employed to meet demands to realize a high recording speed and a high recording density. The multi-beam scanner simultaneously scans a scanning surface of a photoconductive body by a plurality of laser beams.

The multi-beam scanner collimates light beams from a plurality of semiconductor laser diodes, and composes the light beams with a minute mutual angular deviation along a sub scanning direction. The composed light beams are passed through a deflecting means and is imaged on the scanning surface by an imaging optical system in the form of a plurality of light spots, so as to scan a plurality of lines at one time. A semiconductor laser array having a plurality of light emitting points arranged in an array on a single substrate, is used as a light source of the plurality of laser beams.

For example, a Japanese Laid-Open Patent Application No. 8-136841 proposes a technique which adjusts a first optical path of a 2-beam laser diode array to a rotary axis of a rotary member, and rotates a second optical path about the first optical path.

On the other hand, a Japanese Laid-Open Patent Application No. 9-26550 proposes a technique which arranges a desired spot position within an inconsistency range in a depth direction of a plurality of light beams from a laser diode array.

Furthermore, a Japanese Laid-Open Patent Application No. 56-42248 proposes a technique which makes a light source having a plurality of light emitting parts rotatable about an optical axis of an optical lens, so as to adjust a beam pitch.

However, according to the system proposed in the Japanese Laid-Open Patent Application No. 8-136841, the first laser optical path is matched to the center of rotation of the rotary member, and the second laser optical path is rotated by turning the rotary member so as to adjust first and second scanning pitches (pixel density pitches). But because of the construction of this proposed system, the second laser optical path becomes arranged further away from a collimator lens than the first laser optical path. As a result, first and second beam waist positions on the scanning surface become different, thereby making it difficult to obtain a desired beam diameter.

In addition, in the semiconductor laser array having two or more light emitting points, it becomes even more difficult to obtain a desired beam diameter, and it is impossible to cope with the further improvement of the high-speed recording and the high-density recording.

On the other hand, by rotating the collimator lens about the optical axis of the collimator lens, it is possible to obtain a uniform beam pitch and a uniform beam shape with respect to each of the laser beams on an imaging surface side. But in this case, it becomes necessary to increase the precision of the dimensions of the constituent parts so as to match the optical axis of the collimator lens, and the cost of the parts increases. Moreover, when the number of constituent parts of the rotary member becomes large, an accumulation of the errors also becomes large. Consequently, the beam position on the scanning surface deviates from a desired position when the accumulated error is large and the rotary member is turned, and the cost of the system further increases because of the need to adjust and correct the beam position.

SUMMARY OF THE INVENTION

Accordingly, it is a general object of the present invention to provide a novel and useful multi-beam light source unit, multi-beam scanner and image forming apparatus, in which the problems described above are eliminated.

A first object of the present invention is to provide a multi-beam light source unit which uses as a light source a semiconductor laser array having a plurality of light emitting points arranged at equal intervals, wherein an adjustment is made to match a center or an approximate center between the light emitting points at both ends to an optical axis of a collimator lens, and the semiconductor laser array is rotatable about the optical axis of the collimator lens, so that it is possible to obtain a uniform beam pitch and a uniform beam shape can be obtained with respect to each of laser beams on an imaging surface side.

A second object of the present invention is to provide a multi-beam light source unit which a lens outer sleeve of a collimator lens is used as a fit-and-slide part of a rotary member, so as to reduce the number of constituent parts and to turn the rotary member with a high accuracy.

A third object of the present invention is to provide a multi-beam scanner which uses the multi-beam light source unit described above, and capable of obtaining a desired scanning pitch (pixel density pitch) on the scanning surface and obtaining a uniform and desired beam diameter with respect to each of the laser beams.

A fourth object of the present invention is to provide an image forming apparatus which uses the multi-beam scanner described above, and capable of further improving the high-speed recording and the high-density recording without deteriorating the picture quality.

Another and more specific object of the present invention is to provide a multi-beam light source unit comprising a light source emitting a plurality of light beams from corresponding light emitting points arranged in an array at equal intervals, a collimator lens forming the plurality of light beams into parallel bundle of rays, and an adjusting mechanism adjusting relative positions of the light source and the collimator lens so that a central part between the light emitting points at both ends of the light source matches an optical axis of the collimator lens, where the collimator lens is rotatable about the optical axis of the collimator lens. According to the multi-beam light source unit of the present invention, it is possible to achieve the first object described above.

Still an other object of the present invention is to provide the multi-beam light source unit described above, wherein the adjusting mechanism adjusts a position of the collimator lens relative to the light source, and comprises a mirror pipe accommodating therein the collimator lens, and a base having a hole which receives the mirror pipe so that the mirror pipe is rotatable about the optical axis of the collimator lens. According to the multi-beam light source unit of the present invention, it is possible to achieve the second object described above.

A further object of the present invention is to provide a multi-beam scanner comprising a multi-beam light source unit emitting a plurality of light beams, a scanning section scanning a scanning surface by the plurality of light beams from the multi-beam light source unit, and an imaging section imaging the plurality of light beams from the scanning section on the scanning surface, where the multi-beam light source unit comprises a light source emitting a plurality of light beams from corresponding light emitting points arranged in an array at equal intervals, a collimator lens forming the plurality of light beams into parallel bundle of rays, and an adjusting mechanism adjusting relative positions of the light source and the collimator lens so that a central part between the light emitting points at both ends of the light source matches an optical axis of the collimator lens, and the collimator lens is rotatable about the optical axis of the collimator lens. According to the multi-beam scanner of the present invention, it is possible to achieve the third object described above.

Another object of the present invention is to provide an image forming apparatus comprising a multi-beam scanner, and an image transfer system developing an image formed by the multi-beam scanner and transferring the image onto a recording medium, where the multi-beam scanner comprises a multi-beam light source unit emitting a plurality of light beams, a scanning section scanning a scanning surface by the plurality of light beams from the multi-beam light source unit, and an imaging section imaging the plurality of light beams from the scanning section on the scanning surface, the multi-beam light source unit comprises a light source emitting a plurality of light beams from corresponding light emitting points arranged in an array at equal intervals, a collimator lens forming the plurality of light beams into parallel bundle of rays, and an adjusting mechanism adjusting relative positions of the light source and the collimator lens so that a central part between the light emitting points at both ends of the light source matches an optical axis of the collimator lens, and the collimator lens is rotatable about the optical axis of the collimator lens. According to the image forming apparatus of the present invention, it is possible to achieve the fourth object described above.

Other objects and further features of the present invention will be apparent from the following detailed description when read in conjunction with the accompanying drawings.

DESCRIPTION OF THE PREFERRED EMBODIMENTS

Figure 1:
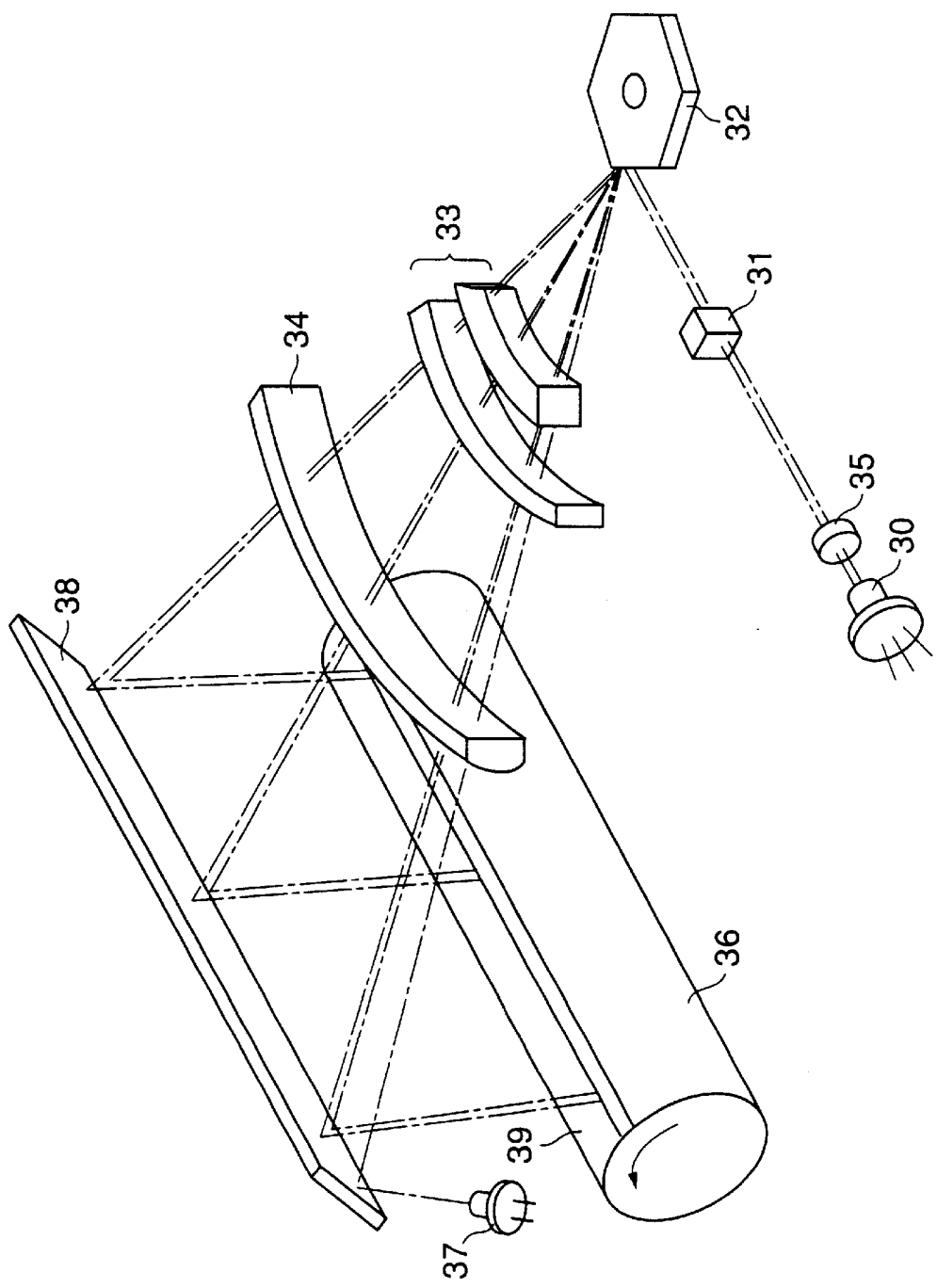
FIG. 1 is a perspective view generally showing the construction of an embodiment of a multi-beam scanner according to the present invention.

FIG. 1 generally shows the construction of an embodiment of a multi-beam scanner according to the present invention.

The multi-beam scanner shown in FIG. 1 generally includes a semiconductor laser array (semiconductor laser diode array) 30 having a plurality of light sources arranged in an array, a collimator lens 35 which forms a plurality of light beams from the semiconductor laser array 30 into parallel or substantially parallel bundle of rays, a cylindrical lens 31 having power in a sub scanning direction, a rotary polygonal mirror 32 which forms a deflecting and scanning means with respect to the light beams, a fθ lens system 33, a toroidal lens 34, a reflecting mirror 38, a photoconductive drum 36 which forms an image bearing body, and a photodetector 37 which detects a scan start timing of each main scan and outputs a synchronizing signal.

The plurality of laser beams emitted from the semiconductor laser array 30 are formed into the parallel or substantially parallel bundle of rays by the collimator lens 35, and is supplied to the deflecting and scanning means which is formed by the rotary polygonal mirror 32 via the cylindrical lens 31.

By rotating this rotary polygonal mirror 32 by a known means, the laser beams repeatedly scan in a main scanning direction. The laser beams reflected by the rotary polygonal mirror 32 are formed into converging light beams by the fθ lens system 33 and the toroidal lens 34 which form an imaging system. The converging light beams are reflected by the reflecting mirror 38 and are projected onto a scanning surface 39, such as the photoconductive drum 36 which is arranged at an imaging position, that is, a beam waist position, in the form of light spots.

If 4 laser beams exist, for example, 4 scanning lines are simultaneously written in one scan, where the 4 scanning lines are arranged at a pixel density pitch P in the sub scanning direction which is perpendicular to the main scanning direction. For example, if the pixel density is 600 dpi, the pixel density pitch P becomes P=1 inch/600≈42.3 μm. In addition, the photodetector 37 is provided at a position outside a region of an effective scanning width, and synchronization is achieved by detecting the laser beams at the scan start timing of each main scan.

Figure 2:
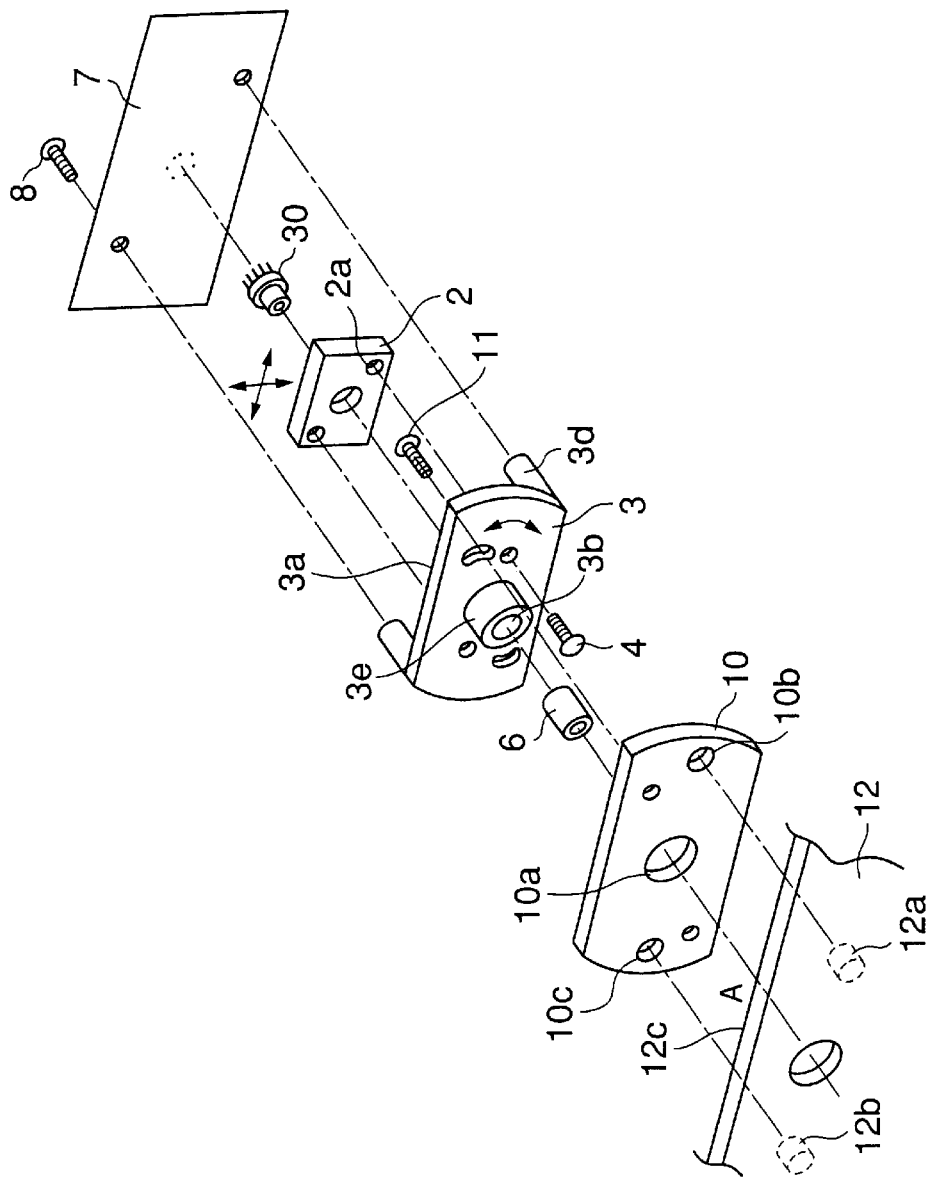
FIG. 2 is a perspective view showing the construction of a first embodiment of a multi-beam light source unit according to the present invention.

FIG. 2 shows the construction of a first embodiment of a multi-beam light source unit according to the present invention.

In FIG. 2, the semiconductor laser array 30 is press-fit or adhered on a support body 2. Alternatively, it is possible to fix the semiconductor laser array 30 on the support body 2 by screws or the like using another member (not shown). The support body 2 is connected to a back surface 3a of a rotary base 3 by screws. Holes in the support body 2 permit play with respect to the screws, so that it is possible to adjust the position of the semiconductor laser array 30 in upward, downward, rightward and leftward directions with respect to an optical axis A of the collimator lens 35.

The collimator lens 35 (not visible in FIG. 2) is accommodated within a mirror pipe 6. This mirror pipe 6 is fitted into a fitting hole 3b of the rotary base 3 and is bonded to the rotary base 3 by matching the position in the direction of the optical axis A with respect to the semiconductor laser array 30. Alternatively, it is possible to fix the mirror pipe 6 on the rotary base 3 by screws or the like.

A sleeve shaft 3e of the rotary base 3 is provided concentrically to the fitting hole 3b. This sleeve shaft 3e fits into a fitting hole 10a of a base 10, and the rotary base 3 is rotatable about the sleeve shaft 3e. In other words, the center of rotation of the rotary base 3 matches or substantially matches the optical axis A of the collimator lens 35. The rotary base 3 is fixed to the base 10 by screws 11 after adjustment of the multi-beam light source unit. A substrate 7 including a driving circuit for the semiconductor laser array 30 is fixed on bosses 3d of the rotary base 3 by screws 8. The multi-beam light source unit is mounted on an optical housing 12 of the multi-beam scanner via positioning pins 12a and 12b which fit into corresponding positioning holes 10b and 10c of the base 10, so that the multi-beam light source unit is mounted with a spatial distance determined by a mounting surface 12c.

Figure 3:
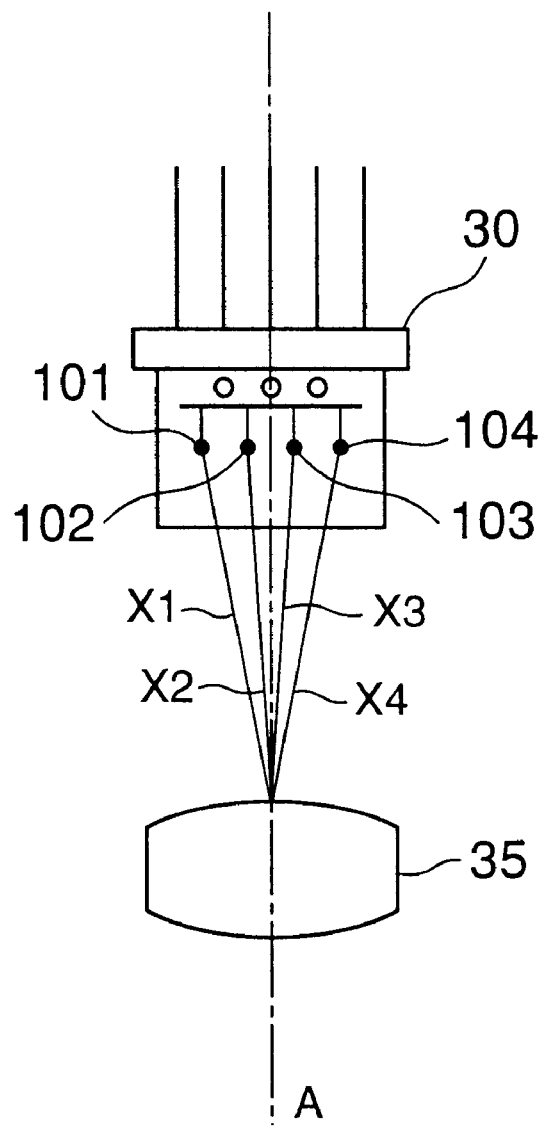
FIG. 3 is a diagram showing a relationship of a semiconductor laser array and a collimator lens.

FIG. 3 shows a relationship of the semiconductor laser array 30 and the collimator lens 35. In addition, FIGS. 4A and 4B respectively show positions of beam spots in a vertical direction (sub scanning direction or pixel density pitch direction) at imaging positions. In explaining an adjusting method hereunder, it is assumed for the sake of convenience that the semiconductor laser array 30 has 4 light sources 101, 102, 103 and 104.

The position of the support body 2 is adjusted in the upward, downward, rightward and leftward directions so that the optical axis A of the collimator lens 35 matches a center between the light sources 101 and 104 at both ends of the semiconductor laser array 30 among the 4 light sources 101 through 104 which are arranged at equal intervals, as shown in FIG. 3. As a result, a distance X1 from the light source 101 to the collimator lens 35, a distance X2 from the light source 102 to the collimator lens 35, a distance X3 from the light source 103 to the collimator lens 35, and a distance X4 from the light source 104 to the collimator lens 35 become substantially the same.

Figure 4A:
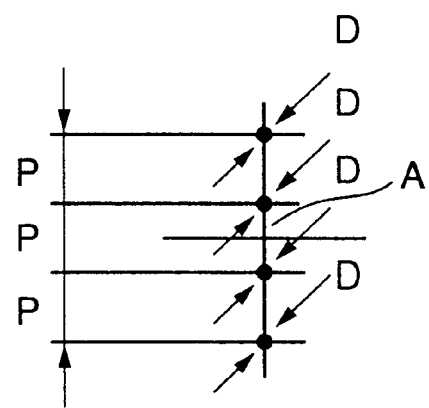
FIGS. 4A and 4B respectively are diagrams for explaining positions of beam spots in a vertical direction (sub scanning direction or pixel density pitch direction) at imaging positions.
Figure 4B:
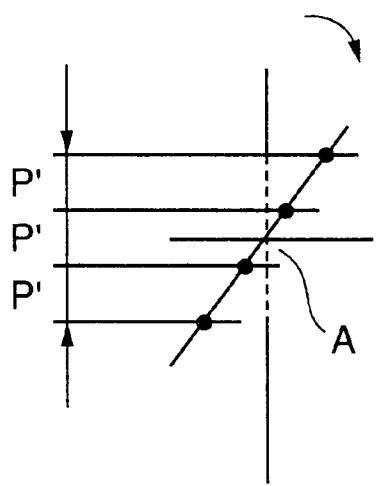

A pitch p of the light sources 101 through 104 is extremely small and is on the order of several tens of μm. For this reason, all of the laser beams from the light source 101 through 104 pass a vicinity of the optical axis A, and a pixel density pitch P and a beam diameter D become approximately uniform at the imaging position for each of the laser beams, as shown in FIG. 4A. When the rotary base 3 is turned in this state, a rotation takes place substantially about the optical axis A, and the pixel density pitch P decreases to a pixel density pitch P' as shown in FIG. 4B. Hence, it is possible to easily obtain a desired pixel density pitch by determining a sub scan magnification of an imaging system so that the pixel density pitch P is greater than the desired pixel density pitch.

Since the rotation takes place in the vicinity of the center of the light sources, the beam position will not greatly deviate due to the rotation. The beam position is thus extremely stable, and is adjustable with a high accuracy. It is possible to maintain compatibility among independent multi-beam light source units by adjusting a rotary position of the multi-beam light source unit by an adjusting tool when adjusting the pixel density pitch P' by this rotation.

The positioning of the rotary position of the multi-beam light source unit is achieved by the positioning holes 10b and 10c provided in the base 10, and the corresponding positioning pins 12a and 12b of the housing 12 which fit into these positioning holes 10b and 10c, as shown in FIG. 2. In other words, the base 10 is positioned by the optical housing 12 and the adjusting tool, so that the base 10 is arranged at the same position as the imaging position of the laser beams. Accordingly, even if it becomes necessary to replace the multi-beam light source unit, it becomes possible to mount a new multi-beam light source unit without adjusting the rotary position thereof.

In this embodiment, the position of the semiconductor laser array 30 is adjusted. However, it is of course possible to adjust the position of the collimator lens 35.

Figure 5:
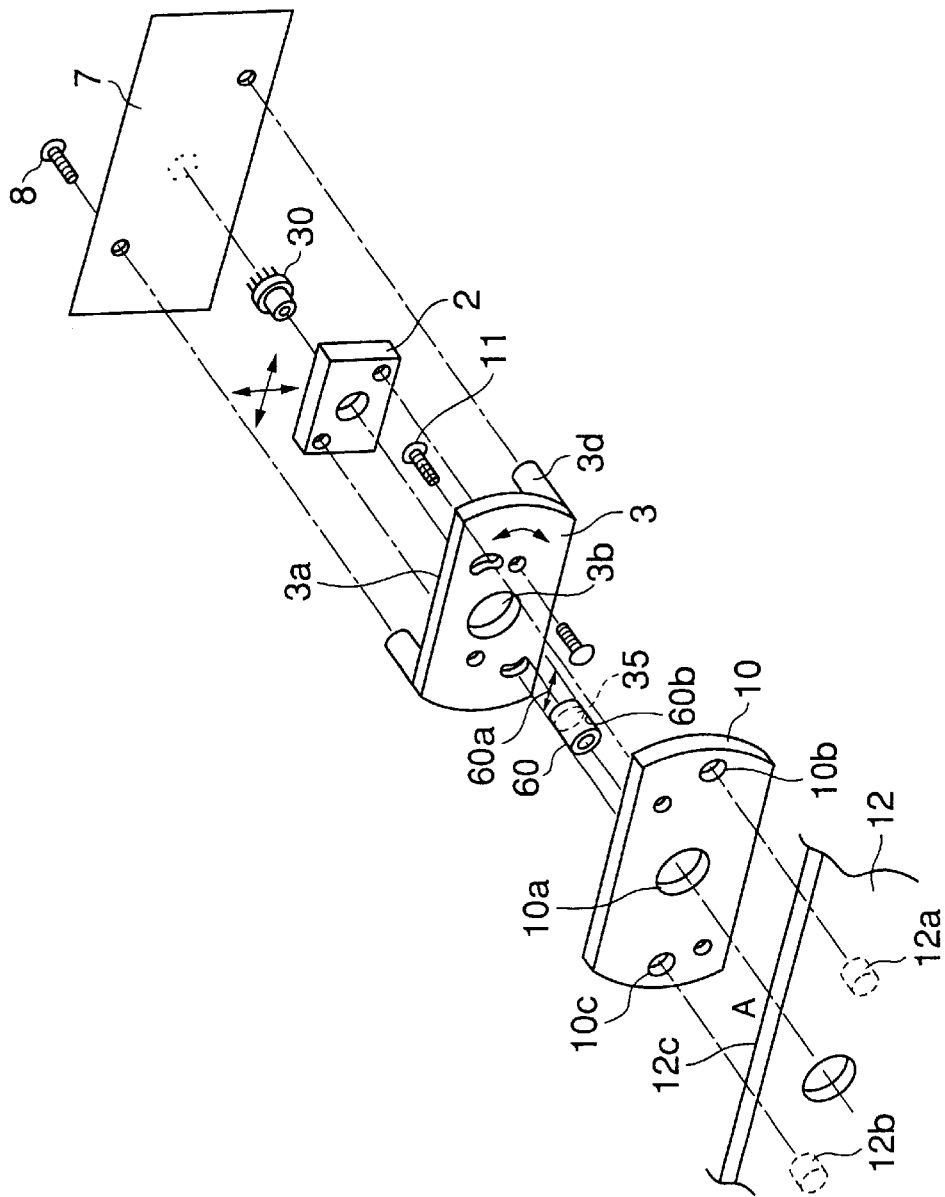
FIG. 5 is a perspective view showing the construction of a second embodiment of the multi-beam light source unit according to the present invention.

Next, a description will be given of a second embodiment of the multi-beam light source unit according to the present invention. FIG. 5 shows the construction of the second embodiment of the multi-beam light source unit. In FIG. 5, those parts which are the same as those corresponding parts in FIG. 2 are designated by the same reference numerals, and a description thereof will be omitted.

As shown in FIG. 5, the collimator lens 35 is bonded or press-fit within a mirror pipe 60. In addition, the mirror pipe 60 is bonded within the fitting hole 3b of the rotary base 3, by matching the position with respect to the semiconductor laser array 30 in the direction of the optical axis A. Alternatively, the mirror pipe 60 is fixed within the fitting hole 3b of the rotary base 3 by screws (not shown) or the like.

The mirror pipe 60 which is fixed to the rotary base 3 fits into the fitting hole 10a of the base 10, and the mirror pipe 60 is rotatable about an outer diameter 60a of the mirror pipe 60. In general, an outer diameter of a lens and an optical axis of the lens can be formed at a high precision with respect to each other, and eccentricity thereof can be suppressed. In addition, the outer diameter 60a of the mirror pipe 60 and an inner fitting part 60b of the mirror pipe 60 into which the collimator lens 35 fits can be formed by a common process, thereby guaranteeing coaxial accuracy of the outer diameter 60a and the inner fitting part 60b. Therefore, the center of the outer diameter 60a of the mirror pipe 60 and the optical axis A of the collimator lens 35 accurately match.

Figure 6:
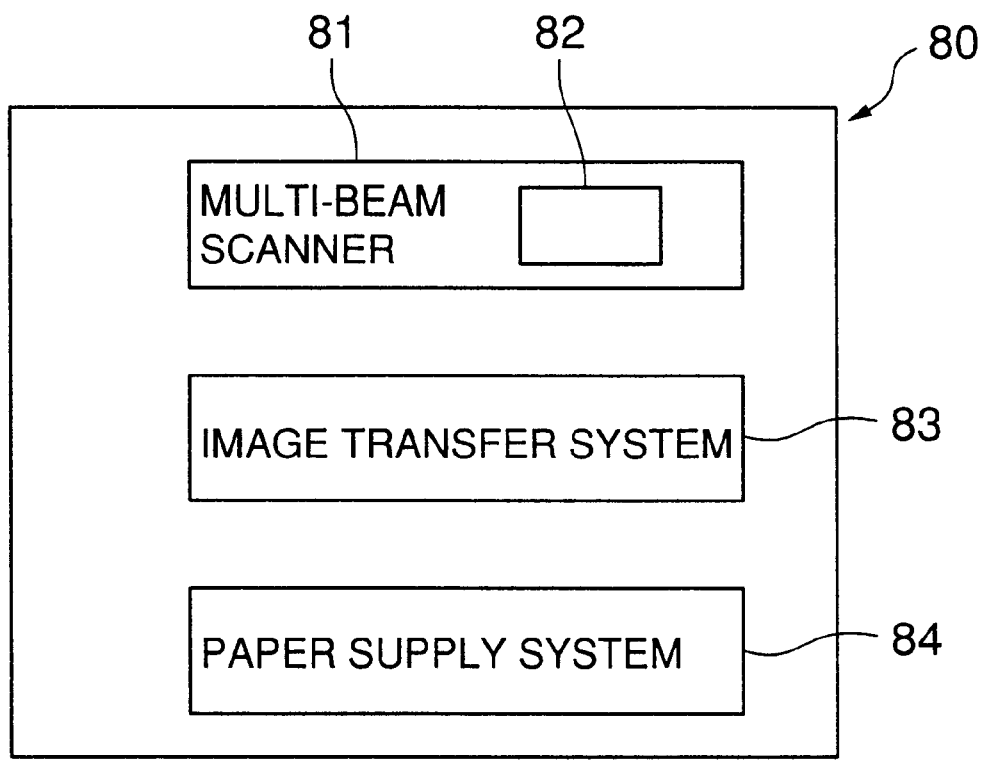
FIG. 6 is a system block diagram showing an embodiment of an image forming apparatus according to the present invention.

FIG. 6 shows an embodiment of an image forming apparatus according to the present invention. In this embodiment of the image forming apparatus, the present invention is applied to any image forming apparatus which uses a multi-beam scanner, such as a laser printer, a digital copying machine, a facsimile machine, and a composite machine which has the functions of two or more of the laser printer, the copying machine and the facsimile machine.

An image forming apparatus 80 shown in FIG. 6 generally includes a multi-beam scanner 81 provided with a multi-beam light source unit 82, an image transfer system 83 which develops an image formed on the photoconductive drum within the multi-beam scanner 81 and transfers the developed image on a recording medium such as paper, and a paper supply system 84 which supplies the paper.

The multi-beam scanner 81 has a construction shown in FIG. 1, for example. Further, the multi-beam light source unit 82 has a construction shown in FIG. 2 or 5, for example.

In this embodiment of the image forming apparatus, the multi-beam light source unit 82 is constructed so that constituent elements thereof are provided within a single package.

The image transfer system 83 and the paper supply system 84 may have known constructions employed by known image forming apparatuses.

Further, the present invention is not limited to these embodiments, but various variations and modifications may be made without departing from the scope of the present invention.

What is claimed is:

1. A multi-beam light source unit comprising:
a light source configured to emit a plurality of light beams from corresponding light emitting points arranged in an array at equal intervals;
a collimator lens configured to form the plurality of light beams into parallel bundle of rays; and
an adjusting mechanism configured to adjust relative positions of the light source and the collimator lens independently so that a central part midway between outermost light emitting points is aligned on an optical axis of the collimator lens,
wherein said collimator lens is configured to be rotatable about the optical axis of the collimator lens.

2. The multi-beam light source unit as claimed in claim 1, wherein said adjusting mechanism adjusts a position of the light source relative to the collimator lens.

3. The multi-beam light source unit as claimed in claim 1, wherein said adjusting mechanism adjusts a position of the collimator lens relative to the light source.

4. The multi-beam light source unit as claimed in claim 3, wherein said adjusting mechanism comprises:
a mirror pipe accommodating therein the collimator lens; and
a base having a hole which receives the mirror pipe so that the mirror pipe is rotatable about the optical axis of the collimator lens.

5. The multi-beam light source unit as claimed in claim 1, wherein the light source, the collimator lens and the adjusting mechanism are provided within a single package.

6. A multi-beam scanner comprising:
a multi-beam light source unit configured to emit a plurality of light beams;
a scanning section configured to scan a scanning surface by the plurality of light beams from the multi-beam light source unit; and
an imaging section configured to image the plurality of light beams from the scanning section on the scanning surface,
said multi-beam light source unit comprising:
a light source configured to emit a plurality of light beams from corresponding light emitting points arranged in an array at equal intervals;
a collimator lens configured to form the plurality of light beams into parallel bundle of rays; and
an adjusting mechanism configured to adjust relative positions of the light source and the collimator lens independently so that a central part midway between outermost light emitting points is aligned on an optical axis of the collimator lens,
wherein said collimator lens is configured to be rotatable about the optical axis of the collimator lens.

7. The multi-beam scanner as claimed in claim 6, wherein said adjusting mechanism adjusts a position of the light source relative to the collimator lens.

8. The multi-beam scanner as claimed in claim 6, wherein said adjusting mechanism adjusts a position of the collimator lens relative to the light source.

9. The multi-beam scanner as claimed in claim 8, wherein said adjusting mechanism comprises:
a mirror pipe accommodating therein the collimator lens; and
a base having a hole which receives the mirror pipe so that the mirror pipe is rotatable about the optical axis of the collimator lens.

10. The multi-beam scanner as claimed in claim 6, wherein the light source, the collimator lens and the adjusting mechanism are provided within a single package.

11. An image forming apparatus comprising:
a multi-beam scanner; and
an image transfer system configured to develop an image formed by the multi-beam scanner and to transfer the image onto a recording medium,
said multi-beam scanner comprising a multi-beam light source unit configured to emit a plurality of light beams, a scanning section configured to scan a scanning surface by the plurality of light beams from the multi-beam light source unit, and an imaging section configured to image the plurality of light beams from the scanning section on the scanning surface,
wherein said multi-beam light source unit comprises a light source configured to emit a plurality of light beams from corresponding light emitting points arranged in an array at equal intervals, a collimator lens configured to form the plurality of light beams into parallel bundle of rays, and an adjusting mechanism configured to adjust relative positions of the light source and the collimator lens independently so that a central part midway between outermost light emitting points is aligned on an optical axis of the collimator lens, and said collimator lens is configured to be rotatable about the optical axis of the collimator lens.

* * * * *